US006253184B1

(12) United States Patent
Ruppert

(10) Patent No.: US 6,253,184 B1
(45) Date of Patent: Jun. 26, 2001

(54) INTERACTIVE VOICE CONTROLLED COPIER APPARATUS

(76) Inventor: Jon Ruppert, 17147 Heatherwood Way, Morgan Hill, CA (US) 95037

( * ) Notice: Subject to any disclaimer, the term of this patent is extended or adjusted under 35 U.S.C. 154(b) by 0 days.

(21) Appl. No.: 09/212,327

(22) Filed: Dec. 14, 1998

(51) Int. Cl.[7] .................................................... G10L 15/22
(52) U.S. Cl. ............................................ 704/275; 704/272
(58) Field of Search .................................... 704/275, 270, 704/272, 231, 200

(56) References Cited

U.S. PATENT DOCUMENTS 4,520,576 6/1985 Vander Molen ........................ 34/534
4,572,652 * 2/1986 Tada et al. ............................. 355/14
4,726,065 2/1988 Froessl ................................ 704/275
4,737,976 4/1988 Borth et al. .......................... 455/563
5,086,385 2/1992 Launey et al. ......................... 700/83
5,303,148 4/1994 Mattson et al. ...................... 600/437
5,335,313 8/1994 Douglas .............................. 704/275
5,375,063 12/1994 Peck et al. ........................... 700/136
5,519,809 5/1996 Husseiny et al. .................... 704/275
5,566,271 10/1996 Tomitsuka et al. .................. 704/275
5,577,165 11/1996 Takebayashi et al. ............... 704/275
5,583,965 12/1996 Douma et al. ....................... 704/275
5,729,659 3/1998 Potter .................................. 704/270
5,950,167 * 9/1999 Yaker .................................. 704/275

FOREIGN PATENT DOCUMENTS

07302017 * 11/1994 (JP) .............................. G03G/21/00
08265474 * 10/1996 (JP) ................................ H04N/1/00
09090818 * 4/1997 (JP) ................................ G10L/3/00

* cited by examiner

*Primary Examiner*—Richemond Dorvil
(74) *Attorney, Agent, or Firm*—Gene Scott-Patent Law & Venture Group

(57) ABSTRACT

A photocopying machine provides the typical capabilities of paper storage, transport reproduction and copy outputting. An electrical circuit stores a plurality of English language inventory human voice commands and a plurality of machine voice responses. A microphone receives each action-request human voice command compares each action-request human voice command with each one of the inventory human voice commands in turn until a match is found and then selects each machine voice response, from the plurality of machine voice responses, corresponding to each said match. An audible message is generated corresponding to each selected machine voice response. When a complete command is received the copying machine responds accordingly.

18 Claims, 2 Drawing Sheets

INTERACTIVE VOICE CONTROLLED COPIER APPARATUS

BACKGROUND OF THE INVENTION

1. Field of the Invention

This invention relates generally to copying machines such as photocopiers as are in common use in offices and the like, and more particularly to such a photocopier or other type of copying machine that is operated in conventional manner and also is adapted for taking voice commands and in carrying-on a voice conversation with a user, i.e., receiving and acting upon a voice commend from a commend set, and responding to a user with a voice response.

2. Description of Related Art

The following art defines the present state of this field:

Borth et al., U.S. Pat. No. 4,737,976, describes an improved hands-free user-interactive control and dialing system for use with a speech communications device. The control system includes a dynamic noise suppressor, a speech recognizer for implementing voice-controlling, a device controller responsive to the speech communications device and for producing status information representing the operating status of the device, and a speech synthesizer for proving reply information to the user as to the speech communications device operating status. In a mobile radiotelephone application, the spectral subtraction noise suppressor is configured to improve the performance of the speech recognizer, the voice quality of the transmitted audio, and the audio switching operation of the vehicular speakerphone. The combination of noise processing, speech recognition, and speech synthesis provides a substantial Improvement to prior art control systems.

Vander Molen. U.S. Pat. No. 4,520,576, describes a speaker independent conversational voice command control system which is useful in connection with home appliances operating within a range of selectable parameters, for recognizing voice commands and emitting synthesized speech sounds, in an interaction with a user, to obtain the input necessary for setting the operating parameters.

Froessl, U.S. Pat. No. 4,726,065, describes an improved method of entering instruction to a data processing system to modify the display includes voice recognition. In one embodiment the screen is divided into sectors and the memory supplying data bits to the display is functionally divided in a corresponding way. The operator utters sector identification and change instructions. Voice recognition apparatus provides recognized location information and instructions to an assembler from which commands are issued to the system. In conjunction with spoken instructions. The system is particularly useful in preparing material for microform storage.

Douglas, U.S. Pat. No. 5,335,313, describes a voice-actuated environmental operator system of the kind which enables a user/patient to use simple voice commands to control a plurality of hospital environment room functions associated with a provided multi-function hospital bed. The operator system uses conventional IBM PC, XT, AT or like computer which has been adapted for interfacing in a pass-though manner with the control unit of a provided hospital bed. The computer includes a voice card and associated voice recognition and training software for interpreting and translating voice input into digital information readable by a controller card for operating a plurality of bed motor and room function commands. The controller card includes a plurality of relay switch devices, each of which are dedicated to performing a specific bed movement or room function. An FCC registered data access arrangements is also provided to the controller card for telephone interface capability. In a first embodiment, data communication between the computer and the provided hospital bed's control unit is by passed-though hard wore cable interface connection between bed control unit and the DB9 and DB15 serial port connectors on the back of the computer. The DB9 and DB15 serial port connectors and disordered off the computer's motherboard and wired directly to the controller board. A headset microphone assembly wearable by a patient user is provided to the system for transmitting voice input it said voice recognition means and receiving system command confirmation signals and telephone communications.

Peck et a., U.S. Pat. No. 5,375,063, describes an apparatus and method for speech recognition control of apparel manufacture equipment, such as a sewing machine, is provided. This invention allows an operator to control specific operational modes of the apparel manufacture equipment though verbal commands recognized by the equipment as distinct from other sounds in the environment of the equipment. The invention includes a device for recognizing and translating an operator's verbal command into an electronic control signal; a communication device such as a microphone for imputing the operator's verbal command into the recognizing and translating device; and interfacing means for presenting the electronic control signal to the apparel manufacture equipment according to the present invention compromises the steps of receiving an operator's verbal command though, for instance, a microphone: recognizing and translating the verbal command into an electronic control signal; and routing this electronic control signal to the apparel manufacture equipment in a form recognized by the equipment.

Takebayashi et al. U.S. Pat. No. 5,577,165, describes a speech dialogue system capable of realizing natural and smooth dialogue between the system and a human user, for easy maneuverability of the system. In this system, a semantic content of input speech from a user is understood and a semantic content determination of a response output is made according to the understood semantic content of the input speech. Then, a speech response and a visual response according to the determined response output are generated and outputted to the user. The dialogue between the system and the user is managed by controlling transitions between user states during which the input speech is to be entered and system states during which the system response is to be outputted. The understanding of a semantic content of input speech from a user is made by detecting keywords in the input speech, with the keywords in the input speech, with the keywords to be detected in the input speech limited in advance, according to a state of a dialogue between the user and the system.

Potter, U.S. Pat. No. 5,729,659, describes how an oral input is used to control a digital computer. Associative searching techniques of tabular data structures are used in conjunction with rules and conventions derived from natural language to facilitate the use of oral input. The method is capable of being implemented in connection with conventional sequential computers, associative single-instruction multiple data computers and parallel processors.

Douma et al., U.S. Pat. No. 5,583,965, describes a voice recognition system and method for training provides a first voice signal representing an instruction as well as a predetermined instruction signal corresponding to the first voice signal and identifying the instruction as well as a predetermined instruction signal to produce voice recognition data for use by the system in identifying the instruction based on a second voice signal representing data for subsequent use instruction in response to a predetermined instruction signal corresponding to the first voice signal.

Mattson et al., U.S. Pat. No. 5,303,148, provides a system which, during surgery, a physician speaks commands that are received by a microphone. A speech processor converts audio signals from the microphone into word signals. A command interpreter compares each word signal with a list previously authorized command words. When the word signal corresponds to one of the pre-selected commands words, a corresponding command signal is generated and sent to a volume imager, a video recorder, hard copy, printer, or other system component. The volume imager generates an image representing signal indicative of the portion of image data stored therein which is displayed on a video monitor or recorded on the video recorder.

Launry et al., U.S. Pat. No. 5,086,385, describes a system and a method of providing an expandable home automation controller which supports multiple numbers and multiple different types of data communications within the home. The system is based upon a central processor, such as a microprocessor-based computer, and is connected by means of a data bus to control various products and subsystems within a home or commercial building, such as lighting systems, security systems, various sensors, multiple external terminals, as well as to allow for the input of commands by a variety of means such as touch-screens, voice recognition systems, telephones, custom switches or other devices capable of providing an input to a computer system.

Husseiny et al., U.S. Pat. No. 5,519,809, describes a computer-aided geographic system highlighting a specified area of a map based on operator input. In a preferred embodiment, voice inputs form and determine the area to be highlighted. In the preferred form, the map used is a globe, and computerized controls turn and tilt the globe in response to the voice commands so that one or more spotlights inside the globe illuminate the area of interest. Information related to the geographic location selected may be retrieved and simultaneously displayed on a computer monitor, video screen, slide screen, and/or narrated by synthesized voice.

Tomitsuka et al., describes an instruction for operation mode control of a VTR and information on the video recording reservation is voice inputted. The voice input is recognized by a voice recognition circuit and is fed to a control circuit. The control circuit controls the VTR in response to the instruction information of the voice input and causes an animation character generating circuit to generate a video image of an animation character for displaying it on the screen of a CRT display. A message from the animation character is voice synthesized and a voice is outputted from a speaker.

The prior art teaches a variety of voice recognition applications related to the operation of equipment. However, the prior art does not teach how a copy machine may be controlled by voice commands and that a dialog between human operator and copy machine may be used to advantage. The present invention fulfills these needs and provides further related advantages as described in the following summary.

SUMMARY OF THE INVENTION

The present invention teaches certain benefits in construction and use which give rise to the objectives described below.

The present invention provides a photocopier or other type of copying machine that is operated in a conventional manner and also is adapted for taking voice commands and in carrying-on an audible voical conversation with a user, i.e., receiving and acting upon a voice commend from a commend set, and responding to a user with a voice response.

A primary objective of the present invention is to provide a voice controlled copier having advantages not taught by the prior art.

Another objective is to provide such a copier having stored in memory, an inventory of verbal statements or questions as responses to human commands.

A further objective is to provide such a copier that is able to respond to an audible human command set interactively so as to converge on a desired action set for carrying out a copier task such as copying a set of originals with a desired quantity, sort, magnification, collation and other copy variables.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
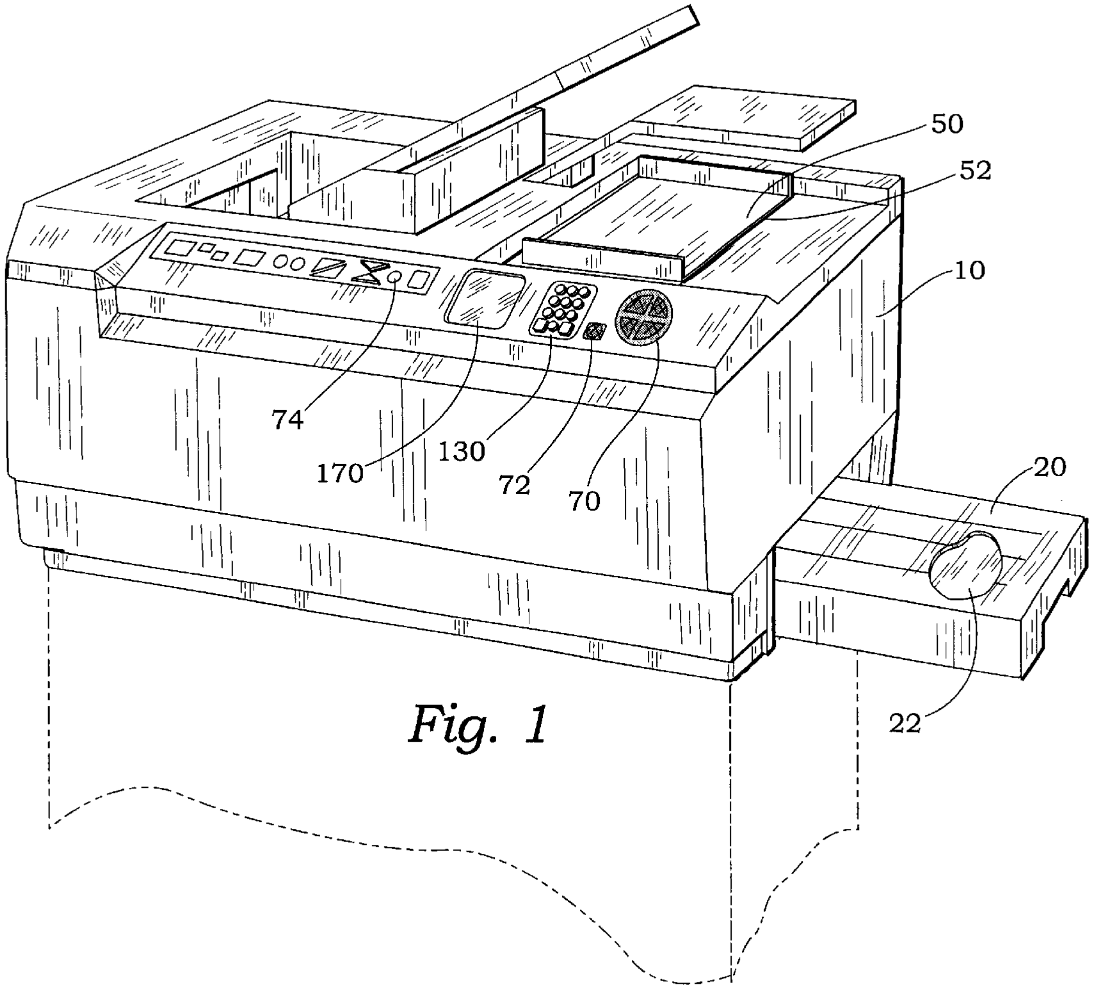
FIG. 1 is a perspective view of the preferred embodiment of the present invention.
Figure 2:
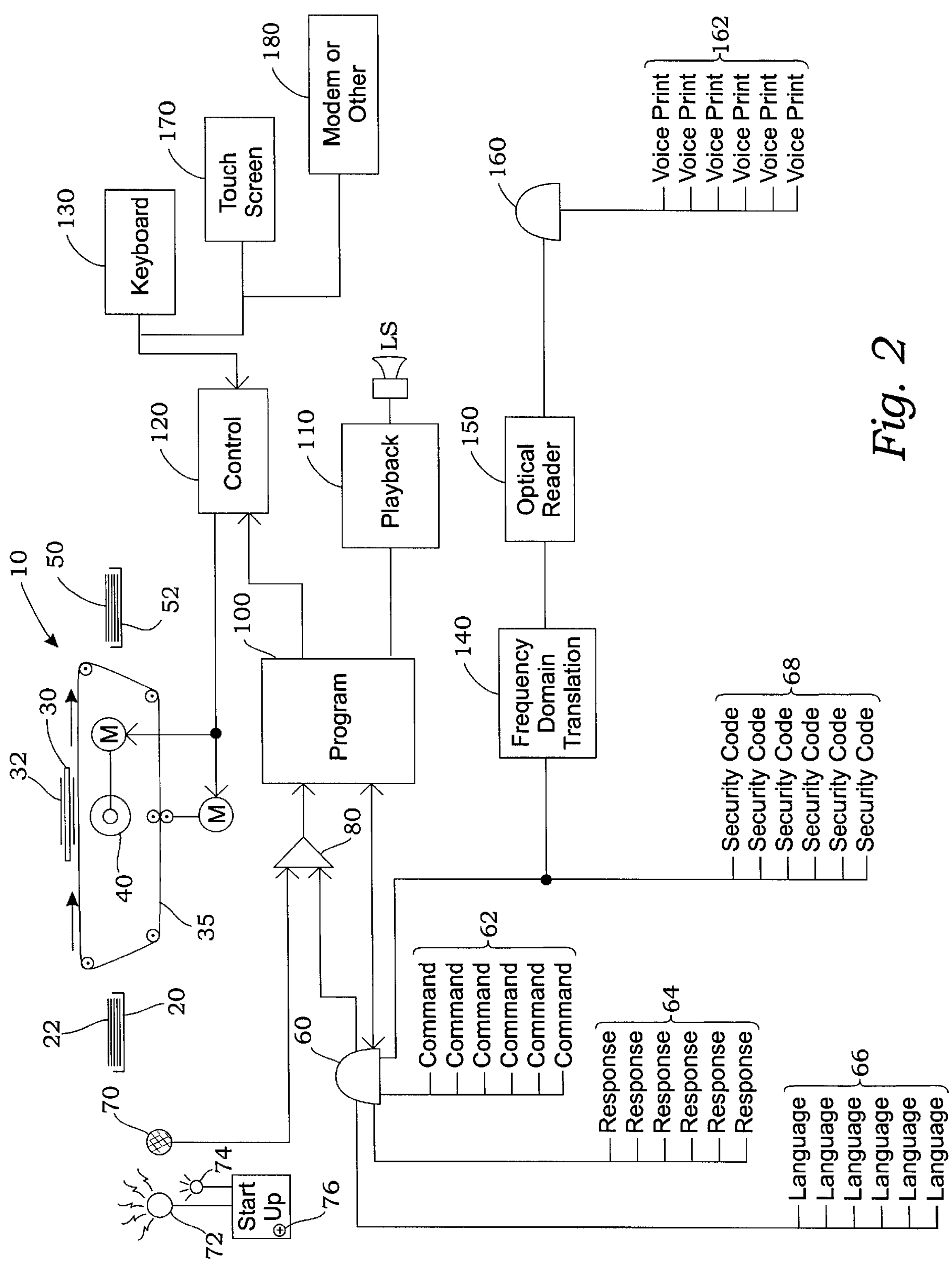
FIG. 2 is an electrical schematic block diagram thereof.

The above described drawing figures illustrate an invention utilizing a copier apparatus not unlike common copiers of well known design, broadly used in business and commerce, the invention comprising: a copying machine 10 providing means for storing 20 copier paper 22 such as a cassette tray, means for positioning 30, such a glass surface, a master document 32 having a master document image to be copied, means for moving 35 such as a conveyor device as is well known in the art, of at least one piece of the copier paper 22 from the storing means 20 to a means for imaging 40, for establishing a permanent image of the master document image onto the at least one piece of the copier paper 22 so as to produce at least one copy 50 of the master document, such imaging means 40 being any one of the well known techniques such as xerography, thermal imaging, laser printing, jet spray printing, etc., and means for moving 35 the at least one copy to a means for storing 52 of the copies 50, again the conveyor device; means for storing 60 a plurality of English and other language inventory human voice commands 62 and a plurality of machine voice responses 64, such as a digital storage device, e.g.: bubble memory or magnetic domain memory; means for receiving 70 each action-request human voice command such as a microphone; means for comparing 80 each said action-request human voice command with each one of the inventory human voice commands 62 in turn until a match is found such as a digital comparitor as is well known in the field of logic circuits; means for selecting 90 each machine voice response such as a computer logic program 100, from the plurality of machine voice responses 64, corresponding to each said match; means for generating each audible message 110 corresponding to each selected machine voice response, such as a playback circuit with a loudspeaker; and means for operating, such as a control circuit 120, the copying machine 10 in response to each action-request human voice command, again a simple logic circuit for activating the various parts of the copier in response to logic circuit function as is well known in the art.

The present invention preferably further comprises a means for selecting a human language for operating the copying machine, such as a keyboard 130 for inputting a selected language, or by programmed prompting, i.e., a verbal phrase, in each of several selected foreign languages 66 until a response is received by the copier in one of the languages, and still further comprises a means for correlating each of the action-request human voice commands spoken in a selected non-English language with the plurality of inventory human voice commands. Such a correlating means may be simply a computerized look-up table for cross-referencing all language responses to English as is well known in the art. In accordance with the foregoing the present invention further comprises a means for generating each audible message corresponding to each selected machine voice response in the selected non-English language as may be achieved by a logic program in any common computer system and is preferably a part of the program 100, i.e. implemented in software.

Preferably, the invention further comprises a means for locking-out all human voice commands not preceded by a security code 68 input wherein the locking-out means is a voice print of a users name. The voice print is preferably an optical image of the users name displayed in the frequency domain as produced by a frequency domain translator 140 and input therefrom into an optical reader 150. Such a voice print and the means for producing it onto a thin-film-transistor matrix or a liquid crystal display device (optical reader 150), as are well known, is clearly within the ability of one of skill in the art. By providing a reading device 150 adjacent to the memory and display device 160, the voice print may be digitized and stored for reference for later comparison with the same utterance by a person seeking to activate the copier 10.

In the case where a voice command is not possible, the invention preferably further comprises a means for manual inputting of commands such as the well known touch sense screen input device 170.

In the case where it is desired to use a document transferred electronically, the invention further comprises a means for receiving, storing and functionally using 180 an electronic or optical reproduction of the master document. Such techniques are well known and in general use the public in copier equipment from, for instance, the Xerox Corporation.

The above described invention preferably utilizes a method of operating comprising the steps of: providing a copying machine having a means for storing copier paper, means for positioning a master document having a master document image to be copied, means for moving at least one piece of the copier paper from the storing means to a means for copying, means for establishing a permanent image of the master document image onto the at least one piece of the copier paper so as to produce at least one copy of the master document, and means for moving the at least one copy to a means for storing copies; storing a plurality of English language inventory human voice commands and a plurality of machine voice responses; receiving an action-request human voice command; comparing said action-request human voice command with each one of the inventory human voice commands in turn until a match is found; selecting a machine voice response, from the plurality of machine voice responses, corresponding to said match; generating an audible message corresponding to said selected machine voice response; repeating steps b–f until an action is identified; and then causing the copying machine to carry out said action. The method preferably further comprises the step of selecting a human language for operating the copying machine and still further comprising the step of correlating each of the action-request human voice commands spoken in a selected non-English language with the plurality of inventory human voice commands. The method preferably further comprises the step of generating each audible message corresponding to each selected machine voice response in the selected non-English language. The method preferably further comprises the step of locking-out all human voice commands not preceded by a security code input such as a voice print of a users name as for instance an optical image of the users name displayed in the frequency domain and the locking-out step utilizes an optical comparison method. The present inventive method preferably comprises a step of manually inputting commands when voice is not functional. The method further advantageously comprises the step of receiving, storing and functionally using an electronic or optical reproduction of the master document.

The method may be more specifically defined and its benefits understood in light of the following time sequence which is only one possible example, as follows:

1. An individual wanting to use the present invention copier physically approaches the copier 10.
2. The copier senses the presence of the individual standing in front of the copier by utilizing an infrared or similar sensor 72.
3. The copier immediately produces an audible phrase; "I am ready. What is your code?," illuminates a blinking "ready" lamp 74 on the front panel of the copier and starts a response waiting timer 76.
4. If no response is received, before the response waiting timer cycles, the copier shuts down its ready lamp and moves into a standby mode maintaining only its IR detector circuit in the "on" state.
5. If the individual replies with an audible code statement, usually the individual's actual name or a special code name assigned to that individual, and the statement is intelligible to the copier after searching for a match in inventory, the copier is programmed to digitize the statement and make a search, comparing the code name to each code name in memory. If the code name is not matched, a machine audible is produced such as "Sorry that name is not recognized, please repeat it."
6. If after multiple tries the name is not recognized the individual is given a parting machine audible and the copier moves to standby mode.
7. If the code name is matched, a machine audible is produced such as "Your account will be charged." "Insert your originals into the feeder."
8. After the original(s) have been placed into the feeder dialog between individual and machine continues with each human response being digitized and then matched with an inventory of possible human responses. For instance in answer to a machine request for "Number of copies?," any numerical response such as "2," "0," "0," would be understood and repeated by a machine audible followed by a human response, "yes." The copier's request for information may include number of copies, single or double sided, collated or not, stapled sets, degree of magnification, degree of darkness, and so on.

9. If the individual does not speak English, the copier may be fitted with a language selection routine whereby immediately after recognizing the individual, a request for language is made by a machine audible such as "State your language of choice." The copier's memory may be fitted to accept any number of languages and to operate using command in these languages.
10. When the copy job is completed, the individual removes copies and originals from the copier and upon sensing this action, the machine issues a machine audible such as "Thank you for using XYZ brand copy technology."

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A copier apparatus comprising:

a copying machine providing means for storing copier paper, means for positioning a master document having a master document image to be copied, means for moving at least one piece of the copier paper from the storing means to a means for copying, means for establishing a permanent image of the master document image onto the at least one piece of the copier paper so as to produce at least one copy of the master document, and means for moving the at least one copy to a means for storing copies;

means for storing a plurality of inventory human voice commands and a plurality of machine voice responses as digitized data sets;

means for receiving an action-request human voice command;

means for comparing said action-request human voice command with each one of the inventory human voice commands in turn until a match is found;

means for selecting a machine voice response, from the plurality of machine voice responses, corresponding to each said match;

means for generating an audible message corresponding to each selected machine voice response;

means for operating the copying machine in response to the action-request human voice command.

2. The apparatus of claim 1 further comprising a means for selecting a human language for operating the copying machine and still further comprising a means for correlating each of the action-request human voice commands spoken in a selected non-English language with the plurality of inventory human voice commands.

3. The apparatus of claim 2 further comprising a means for generating each audible message corresponding to each selected machine voice response in the selected non-English language.

4. The apparatus of claim 1 further comprising a means for locking-out all human voice commends not preceded by a security code input.

5. The apparatus of claim 4 wherein the locking-out means is a voice print of a users name.

6. The apparatus of claim 5 wherein the voice print is an optical image of the users name displayed in the frequency domain.

7. The apparatus of claim 1 further comprising a means for manual input of commands.

8. The apparatus of claim 1 further comprising a means for receiving, storing and functionally using an electronic reproduction of the master document.

9. The apparatus of claim 1 further comprising a means for receiving, storing and functionally using an optical reproduction of the master document.

10. A method of operating a copier apparatus, the method comprising the steps of:

a) providing a copying machine having a means for storing copier paper, means for positioning a master document having a master document image to be copied, means for moving at least one piece of the copier paper from the storing means to a means for copying, means for establishing a permanent image of the master document image onto the at least one piece of the copier paper so as to produce at least one copy of the master document, and means for moving the at least one copy to a means for storing copies;

b) storing a plurality of English language inventory human voice commands and a plurality of machine voice responses;

c) receiving an action-request human voice command;

d) comparing said action-request human voice command with each one of the inventory human voice commands in turn until a match is found;

e) selecting a machine voice response, from the plurality of machine voice responses, corresponding to said match;

f) generating an audible message corresponding to said selected machine voice response;

g) repeating steps b–f until an action is identified; and h) causing the copying machine to carry out said action.

11. The method of claim 10 further comprising the step of selecting a human language for operating the copying machine and still further comprising the step of correlating each of the action-request human voice commands spoken in a selected non-English language with the plurality of inventory human voice commands.

12. The method of claim 11 further comprising the step of generating each audible message corresponding to each selected machine voice response in the selected non-English language.

13. The method of claim 10 further comprising the step of locking-out all human voice commends not preceded by a security code input.

14. The method of claim 13 wherein the locking-out step uses a voice print of a users name.

15. The method of claim 14 wherein the voice print is an optical image of the users name displayed in the frequency domain and the locking-out step utilizes an optical comparison method.

16. The method of claim 10 further comprising a step of manually inputting commands.

17. The method of claim 10 further comprising a step of receiving, storing and functionally using an electronic reproduction of the master document.

18. The method of claim 10 further comprising a step of receiving, storing and functionally using an optical reproduction of the master document.

* * * * *